(12) United States Patent
Zhang et al.

(10) Patent No.: US 11,076,374 B2
(45) Date of Patent: Jul. 27, 2021

(54) METHOD AND EQUIPMENT FOR TRANSMITTING SYNCHRONIZATION SIGNAL AND PSBCH IN V2X COMMUNICATION

(71) Applicant: Samsung Electronics Co., Ltd, Suwon-si (KR)

(72) Inventors: Shichang Zhang, Beijing (CN); Yi Wang, Beijing (CN); Yingyang Li, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/090,576

(22) PCT Filed: Apr. 3, 2017

(86) PCT No.: PCT/KR2017/003650
§ 371 (c)(1),
(2) Date: Oct. 1, 2018

(87) PCT Pub. No.: WO2017/171521
PCT Pub. Date: Oct. 5, 2017

(65) Prior Publication Data
US 2019/0116567 A1 Apr. 18, 2019

(30) Foreign Application Priority Data

Apr. 1, 2016 (CN) .......................... 201610203883.5

(51) Int. Cl.
*H04W 56/00* (2009.01)
*H04W 4/70* (2018.01)
(Continued)

(52) U.S. Cl.
CPC ......... *H04W 56/0015* (2013.01); *H04L 5/005* (2013.01); *H04L 27/2607* (2013.01);
(Continued)

(58) Field of Classification Search
CPC ... H04L 27/2607; H04L 5/0007; H04L 5/005; H04W 4/40; H04W 4/70; H04W 56/0015; H04W 84/18
See application file for complete search history.

(56) References Cited

U.S. PATENT DOCUMENTS

| 2015/0016355 A1 | 1/2015 | Yie et al. |
| 2015/0270939 A1 | 9/2015 | Ro et al. |

(Continued)

FOREIGN PATENT DOCUMENTS

| CN | 104284292 A | 1/2015 |
| CN | 105027642 A | 11/2015 |

(Continued)

OTHER PUBLICATIONS

Huawei, "SLSS and PSBCH design for V2V", R1-16075815-19 Feb. 2016. (Year: 2016).*

(Continued)

*Primary Examiner* — Stephen J Clawson

(57) ABSTRACT

A communication method and equipment for converging a 5th-Generation (5G) communication system for supporting higher data rates beyond a 4th-Generation (4G) system with a technology for Internet of Things (IoT) are provided. A proposed method for transmitting a synchronization signal and a PSBCH in V2X communication includes determining, by a VUE, a value of NIDSL according to its reference synchronization source, NIDSL denoting a sidelink synchronization source ID; determining, by the VUE, an SLSS and a DMRS of a PSBCH different from a D2D system according to the value of NIDSL, wherein the SLSS comprises a PSSS and an SSSS, and the DMRS of the PSBCH is determined by a DMRS sequence of the PSBCH and an orthogonal mask of the DMRS of the PSBCH; and, transmitting, by the VUE, the SLSS and the PSBCH.

10 Claims, 3 Drawing Sheets

(51) Int. Cl.
  *H04W 4/40* (2018.01)
  *H04L 5/00* (2006.01)
  *H04L 27/26* (2006.01)
  *H04W 84/18* (2009.01)

(52) U.S. Cl.
  CPC ............... *H04W 4/40* (2018.02); *H04W 4/70* (2018.02); *H04L 5/0007* (2013.01); *H04W 84/18* (2013.01)

(56) References Cited

U.S. PATENT DOCUMENTS

| | | |
|---|---|---|
| 2016/0044618 A1 | 2/2016 | Sheng et al. |
| 2016/0227495 A1 | 8/2016 | Lee et al. |
| 2016/0330709 A1 | 11/2016 | Li |
| 2017/0041932 A1 | 2/2017 | Chae et al. |
| 2017/0150330 A1* | 5/2017 | Kim ................... H04W 72/042 |
| 2017/0181150 A1 | 6/2017 | Lee et al. |
| 2017/0272299 A1 | 9/2017 | Chae et al. |
| 2017/0280406 A1* | 9/2017 | Sheng ................... H04W 16/10 |
| 2017/0303216 A1 | 10/2017 | Seo et al. |
| 2018/0213498 A1* | 7/2018 | Khoryaev ......... H04W 56/0015 |
| 2018/0220388 A1* | 8/2018 | Chae ....................... H04W 4/46 |
| 2018/0302202 A1* | 10/2018 | Kim ..................... H04L 5/0048 |
| 2019/0222460 A1* | 7/2019 | Kim ..................... H04W 24/10 |

FOREIGN PATENT DOCUMENTS

| | | |
|---|---|---|
| WO | 2015/046985 A1 | 4/2015 |
| WO | 2015/142139 A1 | 9/2015 |
| WO | 2015/167249 A1 | 11/2015 |
| WO | 2016/018068 A1 | 2/2016 |
| WO | 2016/036141 A1 | 3/2016 |
| WO | 2016/048097 A1 | 3/2016 |

OTHER PUBLICATIONS

International Search Report dated Jul. 11, 2017 in connection with International Patent Application No. PCT/KR2017/003650.
Written Opinion of the International Searching Authority dated Jul. 11, 2017 in connection with International Patent Application No. PCT/KR2017/003650.
LG Electronics, "Feasibility Study on LTE-based V2X Services", 3GPP TSG RAN meeting #70, Dec. 7-10, 2015, 15 pages, RP-151941.
"3rd Generation Partnership Project; Technical Specification Group Radio Access Network; Study on LTE-based V2X Services; (Release 14)", 3GPP TR 36.885 V1.0.0, Mar. 2016, 88 pages.
Ericsson, "Distributed Synchronization Procedure for V2X over PC5", 3GPP TSG RAN WG1 Meeting #84, Feb. 15-19, 2016, R1-161072, 5 pages.
Ericsson, "Distributed Synchronization Procedure for V2X over PC5", 3GPP TSG RAN WG1 Meeting #83, Nov. 15-22, 2015, R1-157369, 6 pages.
"A Study on the Development Process and Application of V2X Technology", China Academic Journal Electronic Publishing House, Feb. 29, 2016, 6 pages.
Office Action dated Sep. 17, 2020 in connection with Chinese Patent Application No. 201610203883.5, 18 pages.

* cited by examiner

METHOD AND EQUIPMENT FOR TRANSMITTING SYNCHRONIZATION SIGNAL AND PSBCH IN V2X COMMUNICATION

CROSS-REFERENCE TO RELATED APPLICATIONS

This application is a 371 of International Application No. PCT/KR2017/003650 filed on Apr. 3, 2017, which claims priority to Chinese Patent Application No. 201610203883.5, filed Apr. 1, 2016, the disclosures of which are herein incorporated by reference in their entirety.

BACKGROUND

1. Field

The present invention relates to the technical field of mobile communications, and in particular to a method and equipment for transmitting a V2X synchronization signal and a PSBCH in a Vehicle to Vehicle/Pedestrian/Infrastructure/Network (V2X) communication system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

At present, due to its great potential value in the public safety field and the ordinary civil communication field, the Device to Device (D2D) communication technology has been accepted by the 3rd Generation Partnership Project (3GPP) standards, and has realized the standardization of a part of functions in the 3GPP Rel-12, including the mutual discovery of D2D terminals in a In Coverage (IC) scenario, and the broadcast communications between D2D terminals in a In Coverage (IC) scenario, a Partial Coverage (PC) scenario and an Out of Coverage (OC) scenario.

In accordance with the conclusions from the 3GPP at present, for User Equipments (UEs) participating in the D2D mutual discovery, in order to realize the subframe-level synchronization between D2D terminals in different cells, when a UE transmitting a D2D discovery signal receives a signaling indication of an evolved Node B (eNB) or located on the edge of a cell, the UE needs to transmit a Sidelink Synchronization Signal (SLSS) on a synchronization resource configured by the cell, where the SLSS comprises a Primary Sidelink Synchronization Signal (PSSS) and a Secondary Sidelink Synchronization Signal (SSSS). The PSSS uses a ZC sequence with a length of 62, and root sequence index of 26 and 37. The SSSS consists of two m-sequences each with a length of 31, and the two m-sequences are uniquely determined by an index corresponding to the SSSS (an SSSS index for short hereinafter). For UEs participating in a D2D broadcast communication, in order to realize the subframe-level synchronization between a UE transmitting a broadcast signal and a UE receiving the broadcast signal, when a UE transmitting a broadcast communication signal and locating in coverage of a cell (ICUE) receives a signaling indication of an eNB or located on the edge of a cell, the UE needs to transmit an SLSS on a synchronization resource configured by the cell. In addition, in order to enable an Out of Coverage UE (OCUE) to acquire system frames, system bandwidth, Time Division Duplex (TDD) configuration or other information of the cell, the ICUE transmitting the broadcast communication signal needs to transmit a Physical Sidelink Broadcast Channel (PSBCH), so as to forward the information to the OCUE.

Each UE transmitting an SLSS corresponds to a Sidelink Synchronization Source ID (SLSS ID). Hereinafter, the SLSS ID is expressed by $N_{ID}^{SL}$. For a D2D terminal, the value range of $N_{ID}^{SL}$ is [0,335]. The UE determines the $N_{ID}^{SL}$ by receiving an eNB signaling or by pre-configuration, and the ID is used to determine PSSS and SSSS sequences. Specifically, if $N_{ID}^{SL}<168$, an index of the PSSS root sequence is 26; conversely, the index of the root sequence of the PSSS sequence is 37. The SSSS sequence is determined by two IDs (i.e., $N_{ID}^{(1)}$ and $N_{ID}^{(2)}$) and a currently assumed subframe number, where $N_{ID}^{(1)}=N_{ID}^{SL}$ mod 168, $N_{ID}^{(2)}=\lfloor N_{ID}^{SL}/168 \rfloor$, and the currently assumed subframe number is 0.

The D2D synchronization resource has a period of 40 ms, and by using a cell carrier frequency as a center, occupies six Physical Resource Blocks (PRBs) with a length of one subframe. Wherein, the SLSS occupies four Frequency Division Multiple Access (SC-FDMA) symbols in the subframe, and the remaining symbols are used for PSBCH transmission expect that the last Single Carrier Frequency Division Multiple Access (SC-FDMA) symbol in the subframe is used for the guard interval. Wherein, the PSBCH is used for bearing sidelink subframe number, system bandwidth, cell TDD configuration, synchronization source state or other information. In a same cell, the SLSSs and PSBCHs transmitted by all D2D terminals are identical, and the SLSSs and PSBCHs transmitted by different D2D terminals will be accumulated on the D2D synchronization resource.

An OCUE participating in the D2D broadcast communication measures a Sidelink-Reference Signal Receiving Power (S-RSRP) through a demodulation reference signal of the PSBCH, and the intensity of a synchronization signal needs to select a D2D synchronization source according to the intensity of the D2D synchronization signal from the D2D synchronization source. Since there may be an SLSS from a discovered UE on the SLSS resource, the OCUE will decide a demodulation reference signal of the PSBCH of the synchronization signal based on the S-RSRP so as to measure the intensity of the synchronization signal.

Since the standardized D2D communication in the 3GPP Rel-12/13 is mainly specific to low-speed terminals, as well as services with lower requirements on the time delay sensitivity and receiving reliability, the realized D2D functions are far unable to meet the user demands. Accordingly, in the subsequent 3GPP versions, further enhancing the functional framework of D2D has become a broad consensus for various communication terminal manufacturers and communication network equipment manufacturers nowadays. Wherein, based on the current D2D broadcast communication mechanism, supporting low-delay and high-reliability direct communications between high-speed equipment's, between a high-speed equipment and a low-speed equipment and between a high-speed equipment and a static equipment (e.g., Vehicle to Vehicle/Pedestrian/Infrastructure/Network (V2X)) is one of functions to be standardized preferentially.

In accordance with the requirements proposed by the 3GPP at present, the V2X communication should at least support a relative movement velocity of 280 km/h, and should support a relative movement velocity of 500 km/h as far as possible. In a synchronization link, to meet the requirements, the density of Demodulation Reference Signals (DMRSs) of the PSBCH transmitted by a UE supporting V2X communication services (called a V2X terminal herein, also referred to as a VUE) needs to be increased. In addition, a Global Navigation Satellite System (GNSS) is introduced as a synchronization source into the V2X communication. Since the GNSS is not used in the synchronization process of the D2D broadcast communication, to support this newly introduced synchronization source, the content of the PSBCH transmitted by the VUE may be different from the D2D terminal. Due to the above two factors, the PSBCH transmitted by the VUE is different from the PSBCH transmitted by the D2D terminal. Therefore, the D2D terminal cannot use the VUE as a reference synchronization source.

However, to reduce the workload of the standardization, the PSSS and SSSS sequences in the D2D communication can be reused in the V2X communication. If the D2D terminal successfully detects the SLSS transmitted by the VUE, the D2D terminal may further measure an S-RSRP according to the DMRS position of the PSBCH determined by the SLSS, and eventually reselect a synchronization source according to the result of measurement. Since the D2D terminal is unable to decode the PSBCH transmitted by the VUE, the process of selecting a synchronization source by the D2D terminal will be influenced eventually.

So far, there has been no mature implementation scheme about how to avoid the influence on a D2D terminal from an SLSS and a PSBCH transmitted by a VUE on a carrier shared by the V2X communication and the D2D communication.

SUMMARY

An objective of the present application is to solve at least the technical defects described above, and particularly to provide a backward-compatible method and equipment for transmitting a synchronization signal and a PSBCH in V2X communication in order to avoid the influence on the synchronization process of a D2D terminal from a VUE.

The present application provides a method for transmitting a synchronization signal and a Physical Sidelink Broadcast Channel (PSBCH) in a Vehicle to Vehicle/Pedestrian/Infrastructure/Network (V2X) communication service, comprising the following steps of:

determining, by a VUE, a value of $N_{ID}^{SL}$ according to its reference synchronization source, $N_{ID}^{SL}$ denoting a sidelink synchronization source ID;

determining, by the VUE, a Sidelink Synchronization Signal (SLSS) and/or a Demodulation Reference Signal (DMRS) of a PSBCH different from a Device to Device (D2D) system according to the value of $N_{ID}^{SL}$, wherein the SLSS comprises a Primary Sidelink Synchronization Signal (PSSS) and a Secondary Sidelink Synchronization Signal (SSSS), and the DMRS of the PSBCH is determined by a DMRS sequence of the PSBCH and an orthogonal mask of the DMRS of the PSBCH; and transmitting, by the VUE, the SLSS and the PSBCH.

Preferably, in accordance with the reference synchronization source of the VUE, the VUE is classified into the following four types:

type 1: the VUE is in coverage of a cell, and the VUE uses an evolved Node B (eNB) as a reference synchronization source;

type 2: the VUE is in coverage of a cell, and the VUE uses a Global Navigation Satellite System (GNSS) as a reference synchronization source;

type 3: the VUE is out coverage of a cell, and the VUE uses a GNSS as a reference synchronization source; and type 4: the VUE uses another VUE as a reference synchronization source.

Preferably, the determining, by a VUE, a value of $N_{ID}^{SL}$ according to its reference synchronization source comprises:

if the VUE is of type 1, the VUE determines the value of $N_{ID}^{SL}$ by receiving an eNB signaling, and the value range of $N_{ID}^{SL}$ is [X1,503] or [336,Y1], where both X1 and Y1 are set values;

if the VUE is of type 2, the value range of $N_{ID}^{SL}$ of the VUE is [306,X1) or (Y1,503];

if the VUE is of type 3, the value range of $N_{ID}^{SL}$ of the VUE is [306,X1) or (Y1,503], and the value of $N_{ID}^{SL}$ is same as that of the VUE of type 2, or the value of $N_{ID}^{SL}$ is a value within the value range but different from that of the VUE of type 2; and if the VUE is of type 4, the value of $N_{ID}^{SL}$ of this VUE is the same as the value of $N_{ID}^{SL}$ of a reference synchronization source VUE.

Preferably, the VUE determines a PSSS root sequence index in the following ways:

if the VUE is of type 1 or the value range of $N_{ID}^{SL}$ of the VUE is [X1,503] or [336,Y1], the PSSS root sequence index of the VUE is 26 or 37;

if the VUE is of type 2 or if the value range of $N_{ID}^{SL}$ of the VUE is [306,X1) or (Y1,503], the PSSS root sequence index of the VUE is the same as that of the VUE of type 1; or the PSSS root sequence index of the VUE is 26 or 37 and is different from that of the VUE of type 1;

if the VUE is of type 3, the PSSS root sequence index of the VUE is the same as that of the VUE of type 1; or the PSSS root sequence index of the VUE is 26 or 37 and is different from those of both the VUE of type 1 and the VUE of type 2, and the PSSS root sequence index of the VUE of type 1 is the same as that of the VUE of type 2;

if the VUE is of type 4, the PSSS root sequence index of the VUE is the same as that of a reference synchronization source VUE;

an SSSS sequence transmitted by the VUE corresponds to $N_{ID}^{(1)}=N_{ID}^{SL} \mod 168$ and $N_{ID}^{(2)}=\lfloor N_{ID}^{SL}/168 \rfloor$, and the currently assumed subframe number is 0 or 5; and the DMRS sequence of the PSBCH and the orthogonal mask of the DMRS of the PSBCH transmitted by the VUE are determined according to the following table:

TABLE 1

| Sequence index | $\lfloor N_{ID}^{SL}/16 \rfloor \mod 30$ |
|---|---|
| Sequence cyclic shift | $\lfloor N_{ID}^{SL}/2 \rfloor \mod 8$ |
| Orthogonal mask | [+1 +1], if $N_{ID}^{SL} \mod 2 = 0$ |
| | [+1 −1], if $N_{ID}^{SL} \mod 2 = 1$ |

Preferably, the determining, by a VUE, a value of $N_{ID}^{SL}$ according to its reference synchronization source comprises:

if the VUE is of type 1, the VUE determines the value of $N_{ID}^{SL}$ by receiving an eNB signaling, and the value range of $N_{ID}^{SL}$ is [X2,167] or [0,Y2], where both X2 and Y2 are set values;

if the VUE is of type 2, the value range of $N_{ID}^{SL}$ of the VUE is [0,X2) or (Y2,167];

if the VUE is of type 3, the value range of $N_{ID}^{SL}$ of the VUE is [0,X2) or (Y2,167], and the value of $N_{ID}^{SL}$ is the same as that of the VUE of type 2, or the value of $N_{ID}^{SL}$ a value within the value range but different from that of the VUE of type 2; and if the VUE is of type 4, the value of $N_{ID}^{SL}$ of this VUE is the same as the value of $N_{ID}^{SL}$ of a reference synchronization source VUE.

Preferably, the VUE determines a PSSS root sequence index in the following ways:

if $N_{ID}^{SL} \leq 167$, the root sequence index is 26; or otherwise, the root sequence index is 37;

an SSSS sequence transmitted by the VUE corresponds to $N_{ID}^{(1)}=N_{ID}^{SL} \mod 168$ and $$N_{ID}^{(2)} = \begin{cases} 1, \text{ if } \lfloor N_{ID}^{SL}/168 \rfloor = 0 \\ 0, \text{ if } \lfloor N_{ID}^{SL}/168 \rfloor = 1 \end{cases},$$

and the currently assumed subframe number is 0; or, an SSSS sequence transmitted by the VUE corresponds to $N_{ID}^{(1)}=N_{ID}^{SL} \mod 168$ and $N_{ID}^{(2)}=\lfloor N_{ID}^{SL}/168 \rfloor$, and the currently assumed subframe number is 5; and the DMRS sequence of the PSBCH and the orthogonal mask of the DMRS of the PSBCH transmitted by the VUE are determined according to the following table:

TABLE 2

| Sequence index | $\lfloor N_{ID}^{SL}/16 \rfloor \mod 30$ |
|---|---|
| Sequence cyclic shift | $\lfloor N_{ID}^{SL}/2 \rfloor \mod 8$ |
| Orthogonal mask | [+1 +1], if $N_{ID}^{SL} \mod 2 = 0$ |
| | [+1 −1], if $N_{ID}^{SL} \mod 2 = 1$ |

Preferably, the VUE determines a PSSS root sequence index in the following ways:

if $N_{ID}^{SL} \leq 167$, the root sequence index is 37; or otherwise, the root sequence index is 26;

an SSSS sequence transmitted by the VUE corresponds to $N_{ID}^{(1)}=N_{ID}^{SL} \mod 168$ and $N_{ID}^{(2)}=\lfloor N_{ID}^{SL}/168 \rfloor$, and the currently assumed subframe number is 0; and the DMRS sequence of the PSBCH and the orthogonal mask of the DMRS of the PSBCH transmitted by the VUE are determined according to the following table:

TABLE 3

| Sequence index | $\lfloor N_{ID}^{SL}/16 \rfloor \mod 30$ |
|---|---|
| Sequence cyclic shift | $\lfloor N_{ID}^{SL}/2 \rfloor \mod 8$ |
| Orthogonal mask | [+1 +1], if $N_{ID}^{SL} \mod 2 = 0$ |
| | [+1 −1], if $N_{ID}^{SL} \mod 2 = 1$ |

Preferably, the determining, by a VUE, a value of $N_{ID}^{SL}$ according to its reference synchronization source comprises:

if the VUE is of type 1, the VUE determines the value of $N_{ID}^{SL}$ by receiving an eNB signaling, and the value range of $N_{ID}^{SL}$ is [X3,335] or [168,Y3], where both X3 and Y3 are set values;

if the VUE is of type 2, the value range of $N_{ID}^{SL}$ of the VUE is [168,X3) or (Y3,335];

if the VUE is of type 3, the value range of $N_{ID}^{SL}$ of the VUE is [168,X3) or (Y3,335], and the value of $N_{ID}^{SL}$ is the same as that of the VUE of type 2, or the value of $N_{ID}^{SL}$ or is a value within the value range but different from that of the VUE of type 2; and if the VUE is of type 4, the value of $N_{ID}^{SL}$ of this VUE is the same as the value of $N_{ID}^{SL}$ of a reference synchronization source VUE.

Preferably, the VUE determines a PSSS root sequence index in the following ways:

if the VUE is of type 1 or the value range of $N_{ID}^{SL}$ of the VUE is [X3,335] or [168,Y3], the PSSS root sequence index of the VUE is 26 or 37;

if the VUE is of type 2 or if the value range of $N_{ID}^{SL}$ of the VUE is [168,X3) or (Y3,335], the PSSS root sequence index of the VUE is the same as that of the VUE of type 1; or the PSSS root sequence index of the VUE is 26 or 37 and is different from that of the VUE of type 1;

if the VUE is of type 3, the PSSS root sequence index of the VUE is the same as that of the VUE of type 1; or the PSSS root sequence index of the VUE is 26 or 37 and is different from those of both the VUE of type 1 and the VUE of type 2, and the PSSS root sequence index of the VUE of type 1 is the same as that of the VUE of type 2;

if the VUE is of type 4, the PSSS root sequence index of the VUE is the same as that of a reference synchronization source VUE;

an SSSS sequence transmitted by the VUE corresponds to $N_{ID}^{(1)}=N_{ID}^{SL}$ mod 168 and $N_{ID}^{(2)}=\lfloor N_{ID}^{SL}/168 \rfloor$, and the currently assumed subframe number is 0 or 5; and the DMRS sequence of the PSBCH and the orthogonal mask of the DMRS of the PSBCH transmitted by the VUE are determined according to the following table:

TABLE 4

| Sequence index | $\lfloor N^{SL}_{ID}/16 \rfloor$ mod30 |
|---|---|
| Sequence cyclic shift | $\lfloor N^{SL}_{ID}/2 \rfloor$ mod8 |
| Orthogonal mask | [+1 +1], if $N^{SL}_{ID}$mod2 = 0 |
| | [+1 −1], if $N^{SL}_{ID}$mod2 = 1 |

Preferably, the determining, by a VUE, a value of $N_{ID}^{SL}$ according to its reference synchronization source comprises:

if the VUE is of type 1, the VUE determines the value of $N_{ID}^{SL}$ by receiving an eNB signaling, and the value range of $N_{ID}^{SL}$ is [X3,335] or [168,Y3], where both X3 and Y3 are set values;

if the VUE is of type 2, the value range of $N_{ID}^{SL}$ of the VUE is [168,X3) or (Y3,335];

if the VUE is of type 3, the value range of $N_{ID}^{SL}$ of the VUE is [168,X3) or (Y3,335], and the value of $N_{ID}^{SL}$ is the same as that of the VUE of type 2, or the value of $N_{ID}^{SL}$ is a value within the value range but different from that of the VUE of type 2; and if the VUE is of type 4, the value of $N_{ID}^{SL}$ of this VUE is the same as the value of $N_{ID}^{SL}$ of a reference synchronization source VUE.

Preferably, the VUE determines a PSSS root sequence index in the following ways:

if $N_{ID}^{SL} \leq 167$, the root sequence index is 26; or otherwise, the root sequence index is 37;

an SSSS sequence transmitted by the VUE corresponds to $N_{ID}^{(1)}=N_{ID}^{SL}$ mod 168 and $N_{ID}^{(2)}=\lfloor N_{ID}^{SL}/168 \rfloor$, and the currently assumed subframe number is 0; and the DMRS sequence of the PSBCH and the orthogonal mask of the DMRS of the PSBCH transmitted by the VUE are determined according to one of the following tables:

TABLE 5

| Sequence index | $\lfloor N^{SL}_{ID}/16 \rfloor$ mod30 + $\Delta_1$ |
|---|---|
| Sequence cyclic shift | $\lfloor N^{SL}_{ID}/2 \rfloor$ mod8 + $\Delta_2$ |
| Orthogonal mask | [+1 +1], if $N^{SL}_{ID}$mod2 = 0 |
| | [+1 −1], if $N^{SL}_{ID}$mod2 = 1 | or:

TABLE 6

| Sequence index | $\lfloor N^{SL}_{ID}/16 \rfloor$ mod30 |
|---|---|
| Sequence cyclic shift | $\lfloor N^{SL}_{ID}/2 \rfloor$ mod8 |
| Orthogonal mask | [+1 +1], if $N^{SL}_{ID}$mod2 = 1 |
| | [+1 −1], if $N^{SL}_{ID}$mod2 = 0 | or:

TABLE 7

| Sequence index | $\lfloor N^{SL}_{ID}/16 \rfloor$ mod30 + $\Delta_1$ |
|---|---|
| Sequence cyclic shift | $\lfloor N^{SL}_{ID}/2 \rfloor$ mod8 + $\Delta_2$ |
| Orthogonal mask | [+1 +1], if $N^{SL}_{ID}$mod2 = 1 |
| | [+1 −1], if $N^{SL}_{ID}$mod2 = 0 |

Preferably, if $N_{ID}^{SL}$ of the VUE of type 2 is the same as that of the VUE of type 3, the VUE of type 2 and the VUE of type 3 are distinguished by different values of a particular bit in a PSBCH reserved bit 3 field.

The present application further provides an equipment for transmitting a synchronization signal and a PSBCH in V2X communication, comprising a first determination module, a second determination module and a transmitting module, wherein:

the first determination module is configured to determine a value of $N_{ID}^{SL}$ according to its reference synchronization source, $N_{ID}^{SL}$ denoting a sidelink synchronization source ID;

the second determination module is configured to determine an SLSS different from a D2D system and/or a DMRS of a PSBCH according to the value of $N_{ID}^{SL}$, wherein the SLSS comprises a PSSS and an SSSS, and the DMRS of the PSBCH is determined by a DMRS sequence of the PSBCH and an orthogonal mask of the DMRS of the PSBCH; and the transmitting module is configured to transmit the SLSS and the PSBCH.

Advantageous Effects of Invention

Compared with the prior art, in the technical solutions provided by the present application, a VUE first determines a value of $N_{ID}^{SL}$ according to its reference synchronization source and then determines an SLSS and/or a DMRS of a PSBCH different from a D2D system according to the value of $N_{ID}^{SL}$. Accordingly, a D2D terminal is prevented from measuring an S-RSRP at a DMRS position of a PSBCH transmitted by a VUE, or a D2D terminal is prevented from measuring an S-RSRP value meeting synchronization source reselection conditions at a DMRS position of a PSBCH transmitted by a VUE, so that the influence on the synchronization process of the D2D terminal from the VUE can be avoided easily and effectively.

DETAILED DESCRIPTION

To make the objectives, technical solutions and advantages of the present application clearer, the present application will be further described below in details by embodiments with reference to the accompanying drawings.

Figure 1:
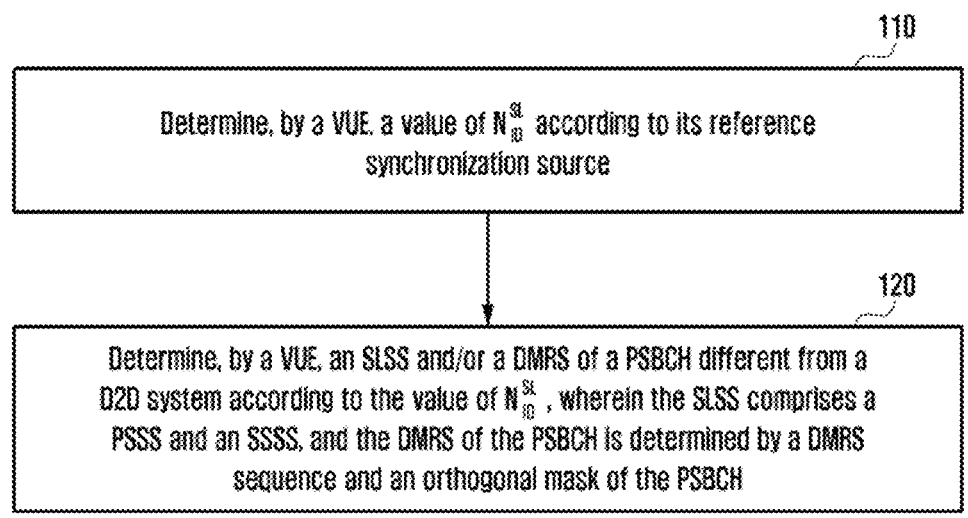
FIG. 1 is a flowchart of an implementation of the present application.

First, in a V2X communication environment, since the PSSS and SSSS sequences transmitted by a VUE are the same as those transmitted by a D2D terminal but a PSBCH transmitted by the VUE is different from that transmitted by the D2D terminal, the synchronization process of the D2D terminal will be influenced if the S-RSPR intensity measured by the D2D terminal according to a demodulation reference signal of the PSBCH transmitted by the VUE meets the synchronization source reselection conditions. To solve the problem, the present invention provides a method for ensuring a backward-compatible V2X user equipment to transmit a synchronization signal and a PSBCH. As shown in FIG. 1, the method comprises the following steps.

Step 110: By a VUE, a value of $N_{ID}^{SL}$ is determined according to its reference synchronization source.

In the present application, the value range of $N_{ID}^{SL}$ can be [0,335] or [336,503].

Figure 2:
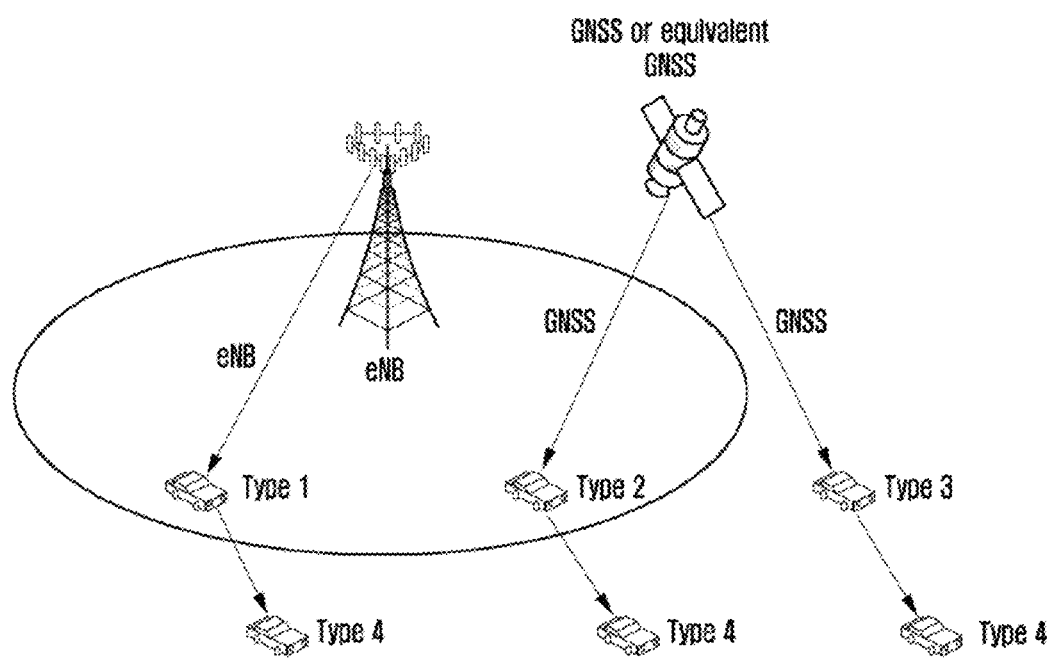
FIG. 2 is a schematic diagram of a reference synchronization source of a VUE and a VUE type according to the present application.

In the present application, the VUE is classified into the following four types in accordance with the reference synchronization source thereof, as shown in FIG. 2:

type 1: the VUE is in coverage of a cell, and the VUE uses an eNB as a reference synchronization source;

type 2: the VUE is in coverage of a cell, and the VUE uses a GNSS as a reference synchronization source;

type 3: the VUE is out coverage of a cell, and the VUE uses a GNSS as a reference synchronization source; and type 4: the VUE uses another VUE as a reference synchronization source.

Step 120: By the VUE, an SLSS and/or a DMRS of a PSBCH different from a D2D system are determined according to the value of $N_{ID}^{SL}$, wherein the SLSS comprises a PSSS and an SSSS, only one of the PSSS and an SSSS is different from the D2D system, and the DMRS of the PSBCH is determined by a DMRS sequence of the PSBCH and an orthogonal mask of the DMRS of the PSBCH.

The way of determining, by the VUE, the PSSS sequence, the SSSS sequence, the DMRS sequence of the PSBCH and the orthogonal mask of the DMRS of the PSBCH can be related to the environment in which the VUE is located and the reference synchronization source of the VUE.

The DMRS sequence of the PSBCH comprises a sequence index of the DMRS and a cyclic shift of the sequence, similarly hereinafter.

Finally, the determined SLSS and PSBCH are transmitted by the VUE.

To easily understand the present application, the technical solutions of the present application will be further described below with reference to specific applications, by taking an inter-equipment interaction mode as an example.

Embodiment 1

In this embodiment, the value range of $N_{ID}^{SL}$ of a VUE is [336,503]. The flowchart of the method provided in this embodiment is the same as in FIG. 1, and specifically comprises the following steps.

In step 110, by a VUE, a value of $N_{ID}^{SL}$ is determined according to its reference synchronization source.

The VUE determines the specific value of $N_{ID}^{SL}$ in the following ways:

if the VUE is of type 1, the VUE determines the value of $N_{ID}^{SL}$ by receiving an eNB signaling, and the value range of $N_{ID}^{SL}$ in this case is [X1,503] or [336,Y1], where both X1 and Y1 are values defined by the standard; for example, X1=336, 337 or 338, and Y1=503, 502 or 501; in this case, the signaling can be the same as an existing signaling used for configuring $N_{ID}^{SL}$ of a D2D terminal, or be a certain redefined signaling;

if the VUE is of type 2, the value range of $N_{ID}^{SL}$ of the VUE is [306,X1) or (Y1,503], for example, $N_{ID}^{SL}$=306 or $N_{ID}^{SL}$=503;

if the VUE is of type 3, the value range of $N_{ID}^{SL}$ of the VUE is [306,X1) or (Y1,503], for example, the value of $N_{ID}^{SL}$ is the same as that of the VUE of type 2, or the value of $N_{ID}^{SL}$ is another value within the value range but different from that of the VUE of type 2; and if the VUE is of type 4, the value of $N_{ID}^{SL}$ of this VUE is the same as the value of $N_{ID}^{SL}$ of a reference synchronization source VUE.

In step 120, by the VUE, a PSSS sequence, an SSSS sequence, a DMRS sequence of a PSBCH, and an orthogonal mask of the DMRS of the PSBCH are determined according to the value of $N_{ID}^{SL}$.

The VUE determines a PSSS root sequence index in the following ways:

if the VUE is of type 1 or the value range of $N_{ID}^{SL}$ of the VUE is [X1,503] or [336,Y1], the PSSS root sequence index of the VUE is 26 or 37;

if the VUE is of type 2 or if the value range of $N_{ID}^{SL}$ of the VUE is [306,X1) or (Y1,503], the PSSS root sequence index of the VUE is the same as that of the VUE of type 1; or the PSSS root sequence index of the VUE is 26 or 37 and is different from that of the VUE of type 1;

if the VUE is of type 3, the PSSS root sequence index of the VUE is the same as that of the VUE of type 1; or the PSSS root sequence index of the VUE is 26 or 37 and is different from those of both the VUE of type 1 and the VUE of type 2, where the PSSS root sequence index of the VUE of type 1 is the same as that of the VUE of type 2 in this case; and if the VUE is of type 4, the PSSS root sequence index of the VUE is the same as that of a reference synchronization source VUE.

The SSSS sequence transmitted by the VUE corresponds to $N_{ID}^{(1)}=N_{ID}^{SL} \mod 168$ and $N_{ID}^{(2)}=\lfloor N_{ID}^{SL}/168 \rfloor$, and the currently assumed subframe number can be 0 or 5.

The sequence and the orthogonal mask of the PSBCH DMRS transmitted by the VUE are determined according to the following table:

TABLE 9

| | |
|---|---|
| Sequence index | $\lfloor N^{SL}_{ID}/16 \rfloor \mod 30$ |
| Sequence cyclic shift | $\lfloor N^{SL}_{ID}/2 \rfloor \mod 8$ |
| Orthogonal mask | [+1 +1], if $N^{SL}_{ID} \mod 2 = 0$ |
| | [+1 −1], if $N^{SL}_{ID} \mod 2 = 1$ |

It is to be specifically noted that, by this method, if $N_{ID}^{SL}$ of the VUE of type 2 is the same as that of the VUE of type 3, the VUE of type 2 and the VUE of type 3 are distinguished by different values of a particular bit in a PSBCH reserved bit field, and the specific position of the bit in the reserved bit field and the meanings of different values of the bit are defined by the standard. For example, the first bit in the reserved bit field is used for interpreting the VUE of type 2 and the VUE of type 3; the VUE is of type 2 if the bit value is 0, while the VUE is of type 3 if the bit value is 1; or otherwise, the VUE is of type 2 if the bit value is 1, while the VUE is of type 3 if the bit value is 0.

Now, this embodiment ends. By the method provided in this embodiment, the existing method for determining a PSSS root sequence index, an SSSS sequence, a DMRS sequence of the PSBCH, and a DMRS mask of the PSBCH can be multiplexed as far as possible. However, with regard to this method, a new SSSS sequence needs to be introduced, and the standardization will be influenced greatly.

Embodiment 2

In this embodiment, the value range of $N_{ID}^{SL}$ of a VUE is [0,335]. The flowchart of the method provided in this embodiment is the same as in FIG. 1, and specifically comprises the following steps.

In step 110, by a VUE, a value of $N_{ID}^{SL}$ is determined according to its reference synchronization source.

The VUE determines the specific value of $N_{ID}^{SL}$ in the following ways:

if the VUE is of type 1, the VUE determines the value of $N_{ID}^{SL}$ by receiving an eNB signaling, and the value range of $N_{ID}^{SL}$ in this case is [X2,167] or [0,Y2], where both X2 and Y2 are values defined by the standard; for example, X2=0, 1 or 2, and Y2=165, 166 or 167; in this case, the signaling can be the same as an existing signal used for configuring $N_{ID}^{SL}$ of a D2D terminal, or be a certain redefined signaling;

if the VUE is of type 2, the value range of $N_{ID}^{SL}$ of the VUE is [0,X2) or (Y2,167], for example, $N_{ID}^{SL}=0$ or $N_{ID}^{SL}=335$;

if the VUE is of type 3, the value range of $N_{ID}^{SL}$ of the VUE is [0,X2) or (Y2,167], for example, the value of $N_{ID}^{SL}$ is the same as that of the VUE of type 2, or the value of $N_{ID}^{SL}$ is another value within the value range but different from that of the VUE of type 2; and if the VUE is of type 4, the value of $N_{ID}^{SL}$ of this VUE is the same as the value of $N_{ID}^{SL}$ of a reference synchronization source VUE.

In step 120, by the VUE, a PSSS sequence, an SSSS sequence, a DMRS sequence of a PSBCH, and an orthogonal mask of the DMRS of the PSBCH are determined according to the value of $N_{ID}^{SL}$.

The VUE determines a PSSS root sequence index in the following ways:

if $N_{ID}^{SL} \leq 167$, the root sequence index is 26; or otherwise, the root sequence index is 37. In this case, the SSSS sequence transmitted by the VUE corresponds to $N_{ID}^{(1)}=N_{ID}^{SL} \bmod 168$ and $$N_{ID}^{(2)} = \begin{cases} 1, \text{ if } \lfloor N_{ID}^{SL}/168 \rfloor = 0 \\ 0, \text{ if } \lfloor N_{ID}^{SL}/168 \rfloor = 1 \end{cases},$$

and the currently assumed subframe number is 0. Or, the SSSS sequence transmitted by the VUE corresponds to $N_{ID}^{(1)}=N_{ID}^{SL} \bmod 168$ and $N_{ID}^{(2)}=\lfloor N_{ID}^{SL}/168 \rfloor$, and the currently assumed subframe number is 5.

Or, the VUE determines a PSSS root sequence index in the following ways:

if $N_{ID}^{SL} \leq 167$, the root sequence index is 37; or otherwise, the root sequence index is 26. In this case, the SSSS sequence transmitted by the VUE corresponds to $N_{ID}^{(1)}=N_{ID}^{SL} \bmod 168$ and $N_{ID}^{(2)}=\lfloor N_{ID}^{SL}/168 \rfloor$, and the currently assumed subframe number is 0.

The sequence and the orthogonal mask of the PSBCH DMRS transmitted by the VUE are determined according to the following table:

TABLE 10

| | |
|---|---|
| Sequence index | $\lfloor N_{ID}^{SL}/16 \rfloor \bmod 30$ |
| Sequence cyclic shift | $\lfloor N_{ID}^{SL}/2 \rfloor \bmod 8$ |
| Orthogonal mask | [+1 +1], if $N_{ID}^{SL} \bmod 2 = 0$ |
| | [+1 −1], if $N_{ID}^{SL} \bmod 2 = 1$ |

It is to be specifically noted that, by this method, if $N_{ID}^{SL}$ of the VUE of type 2 is the same as that of the VUE of type 3, the VUE of type 2 and the VUE of type 3 are distinguished by different values of a particular bit in a PSBCH reserved bit field, and the specific position of the bit in the reserved bit field and the meanings of different values of the bit are defined by the standard. For example, the first bit in the reserved bit field is used for interpreting the VUE of type 2 and the VUE of type 3; the VUE is of type 2 if the bit value is 0, while the VUE is of type 3 if the bit value is 1; or otherwise, the VUE is of type 2 if the bit value is 1, while the VUE is of type 3 if the bit value is 0.

Now, this embodiment ends. By the method provided in this embodiment, the introduction of a new SSSS sequence can be avoided as far as possible, so that the influence on the standardization can be effectively reduced.

Embodiment 3

In this embodiment, the value range of $N_{ID}^{SL}$ of a VUE is [168,335]. The flowchart of the method provided in this embodiment is the same as in FIG. 1, and specifically comprises the following steps.

In step 110, by a VUE, a value of $N_{ID}^{SL}$ is determined according to its reference synchronization source.

The VUE determines the specific value of $N_{ID}^{SL}$ in the following ways:

if the VUE is of type 1, the VUE determines the value of $N_{ID}^{SL}$ by receiving an eNB signaling, and the value range of $N_{ID}^{SL}$ in this case is [X3,335] or [168,Y3], where both X3 and Y3 are values defined by the standard; for example, X3=168, 169 or 170, and Y3=333, 334 or 335; in this case, the signaling can be the same as an existing signal used for configuring $N_{ID}^{SL}$ of a D2D terminal, or be a certain redefined signaling;

if the VUE is of type 2, the value range of $N_{ID}^{SL}$ of the VUE is [168,X3) or (Y3,335], for example, $N_{ID}^{SL}=168$ or $N_{ID}^{SL}=167$;

if the VUE is of type 3, the value range of $N_{ID}^{SL}$ of the VUE is [168,X3) or (Y3,335], for example, the value of $N_{ID}^{SL}$ is the same as that of the VUE of type 2, or the value of $N_{ID}^{SL}$ is another value within the value range but different from that of the VUE of type 2; and if the VUE is of type 4, the value of $N_{ID}^{SL}$ of this VUE is the same as the value of $N_{ID}^{SL}$ of a reference synchronization source VUE.

In step 120, by the VUE, a PSSS sequence, an SSSS sequence, a DMRS sequence of a PSBCH, and an orthogonal mask of the DMRS of the PSBCH are determined according to the value of $N_{ID}^{SL}$.

If the VUE is of type 1 or the value range of $N_{ID}^{SL}$ of the VUE is [X3,335] or [168,Y3], the PSSS root sequence index of the VUE is 26 or 37.

If the VUE is of type 2 or if the value range of $N_{ID}^{SL}$ of the VUE is [168,X3) or (Y3,335], the PSSS root sequence index of the VUE is the same as that of the VUE of type 1; or the PSSS root sequence index of the VUE is 26 or 37 and is different from that of the VUE of type 1.

If the VUE is of type 3, the PSSS root sequence index of the VUE is the same as that of the VUE of type 1; or the PSSS root sequence index of the VUE is 26 or 37 and is different from those of both the VUE of type 1 and the VUE of type 2, where the PSSS root sequence index of the VUE of type 1 is the same as that of the VUE of type 2 in this case.

If the VUE is of type 4, the PSSS root sequence index of the VUE is the same as that of a reference synchronization source VUE.

The SSSS sequence transmitted by the VUE corresponds to $N_{ID}^{(1)}=N_{ID}^{SL} \bmod 168$ and $N_{ID}^{(2)}=\lfloor N_{ID}^{SL}/168 \rfloor$, and the currently assumed subframe number can be 0 or 5.

The sequence and the orthogonal mask of the PSBCH DMRS transmitted by the VUE are determined according to the following table:

TABLE 11

| Sequence index | $\lfloor N^{SL}_{ID}/16 \rfloor \bmod 30$ |
|---|---|
| Sequence cyclic shift | $\lfloor N^{SL}_{ID}/2 \rfloor \bmod 8$ |
| Orthogonal mask | [+1 +1], if $N^{SL}_{ID} \bmod 2 = 0$ |
| | [+1 −1], if $N^{SL}_{ID} \bmod 2 = 1$ |

It is to be specifically noted that, by this method, if $N_{ID}^{SL}$ of the VUE of type 2 is the same as that of the VUE of type 3, the VUE of type 2 and the VUE of type 3 are distinguished by different values of a particular bit in a PSBCH reserved bit field, and the specific position of the bit in the reserved bit field and the meanings of different values of the bit are defined by the standard. For example, the first bit in the reserved bit field is used for interpreting the VUE of type 2 and the VUE of type 3; the VUE is of type 2 if the bit value is 0, while the VUE is of type 3 if the bit value is 1; or otherwise, the VUE is of type 2 if the bit value is 1, while the VUE is of type 3 if the bit value is 0.

Now, this embodiment ends. The method provided in this embodiment has the advantages of both Embodiment 1 and Embodiment 2. The existing method for determining a PSSS root sequence index, an SSSS sequence, a DMRS sequence of the PSBCH and a DMRS mask of the PSBCH can be multiplexed as far as possible. Meanwhile, this method does not need to introduce a new SSSS sequence, so the influence on the standardization can be avoided. However, when the priority of the SLSS transmitted by a D2D terminal is the same as the priority of the SLSS transmitted by the VUE, the influence on the D2D terminal receiving a synchronization signal cannot be avoided in this embodiment.

Embodiment 4

In this embodiment, in one or more ways of changing a root sequence index of the DMRS sequence of the PSBCH, or a cyclic shift of the DMRS sequence of the PSBCH or changing an orthogonal mask of the DMRS of the PSBCH, the orthogonality of the DMRS of the PSBCH transmitted by a VUE and the DMRS of the PSBCH transmitted by a D2D terminal is ensured, so that the D2D terminal is prevented from measuring and obtaining an S-RSRP value meeting the synchronization source reselection conditions on the DMRS of the PSBCH transmitted by the VUE. The value range of $N_{ID}^{SL}$ of the VUE is [0,335]. The flowchart of the method provided in this embodiment is the same as in FIG. 1, and specifically comprises the following steps.

In step 110, by a VUE, a value of $N_{ID}^{SL}$ W is determined according to its reference synchronization source.

A method for determining $N_{ID}^{SL}$ by the VUE in this embodiment is the same as that in Embodiment 3.

In step 120, by the VUE, a PSSS sequence, an SSSS sequence, a DMRS sequence of a PSBCH, and an orthogonal mask of the DMRS of the PSBCH are determined according to the value of $N_{ID}^{SL}$.

The VUE determines a PSSS root sequence index in the following ways:

if $N_{ID}^{SL} \leq 167$, the root sequence index is 26; or otherwise, the root sequence index is 37.

The SSSS sequence transmitted by the VUE corresponds to $N_{ID}^{(1)} = N_{ID}^{SL} \bmod 168$ and $N_{ID}^{(2)} = \lfloor N_{ID}^{SL}/168 \rfloor$, and the currently assumed subframe number is 0.

The sequence and the orthogonal mask of the PSBCH DMRS are determined according to one of the following tables:

TABLE 12

| Sequence index | $\lfloor N^{SL}_{ID}/16 \rfloor \bmod 30 + \Delta_1$ |
|---|---|
| Sequence cyclic shift | $\lfloor N^{SL}_{ID}/2 \rfloor \bmod 8 + \Delta_2$ |
| Orthogonal mask | [+1 +1], if $N^{SL}_{ID} \bmod 2 = 0$ |
| | [+1 −1], if $N^{SL}_{ID} \bmod 2 = 1$ | or:

TABLE 13

| Sequence index | $\lfloor N^{SL}_{ID}/16 \rfloor \bmod 30$ |
|---|---|
| Sequence cyclic shift | $\lfloor N^{SL}_{ID}/2 \rfloor \bmod 8$ |
| Orthogonal mask | [+1 +1], if $N^{SL}_{ID} \bmod 2 = 1$ |
| | [+1 −1], if $N^{SL}_{ID} \bmod 2 = 0$ | or

TABLE 14

| Sequence index | $\lfloor N^{SL}_{ID}/16 \rfloor \bmod 30 + \Delta_1$ |
|---|---|
| Sequence cyclic shift | $\lfloor N^{SL}_{ID}/2 \rfloor \bmod 8 + \Delta_2$ |
| Orthogonal mask | [+1 +1], if $N^{SL}_{ID} \bmod 2 = 1$ |
| | [+1 −1], if $N^{SL}_{ID} \bmod 2 = 0$ | where $\Delta_1$ and $\Delta_2$ are values defined by the standard, the value range of $\Delta_1$ is [0,29], the value range of $\Delta_2$ is [0,7], and one of the both can be 0.

It is to be specifically noted that, by this method, if $N_{ID}^{SL}$ of the VUE of type 2 is the same as that of the VUE of type 3, the VUE of type 2 and the VUE of type 3 are distinguished by different values of a particular bit in a PSBCH reserved bit field, and the specific position of the bit in the reserved bit field and the meanings of different values of the bit are defined by the standard. For example, the first bit in the reserved bit field is used for interpreting the VUE of type 2 and the VUE of type 3; the VUE is of type 2 if the bit value is 0, while the VUE is of type 3 if the bit value is 1; or otherwise, the VUE is of type 2 if the bit value is 1, while the VUE is of type 3 if the bit value is 0.

Now, this embodiment ends. In the method provided by this embodiment, the exiting method for determining a PSSS root sequence index and an SSSS sequence can be multiplexed as far as possible, and a new SSSS sequences does not need to be introduced. However, the sequence or orthogonal mask of the DMRS needs to be refined, and the standardization will be influenced to a certain extent.

Figure 3:
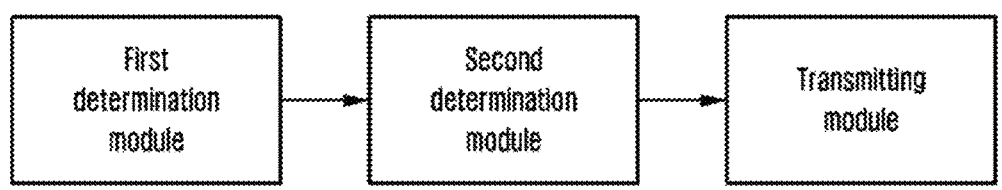
FIG. 3 is a schematic diagram of a composition structure of a preferred equipment according to the present invention.

The present application further provides an equipment for transmitting a synchronization signal and a PSBCH in V2X communication, the structure of which is shown in FIG. 3, comprising a first determination module, a second determination module and a transmitting module, wherein:

the first determination module is configured to determine a value of $N_{ID}^{SL}$ according to its reference synchronization source, $N_{ID}^{SL}$ denoting a sidelink synchronization source ID;

the second determination module is configured to determine an SLSS and/or a DMRS of a PSBCH different from a D2D system according to the value of $N_{ID}^{SL}$, wherein the SLSS comprises a PSSS and an SSSS, and the DMRS of the PSBCH is determined by a DMRS sequence of the PSBCH and an orthogonal mask of the DMRS of the PSBCH; and the transmitting module is configured to transmit the SLSS and the PSBCH.

It can be understood by a person of ordinary skill in the art that all of or a part of steps in the embodiment methods can be implemented by instructing related hardware by programs. The programs can be stored in a computer-readable storage medium, and, when executed, include one or a combination of the steps of the method embodiments.

In addition, each functional unit in each embodiment of the present application can be integrated into one processing module; or, each unit can exist alone physically; or, two or more units can be integrated into one module. The integrated module can be implemented in the form of hardware, or can be implemented the form of a software functional module. If the integrated module is implemented in the form of a software functional module and sold or used as an independent product, the integrated module can also be stored in a computer-readable storage medium.

In addition, the embodiments of the present invention can be implemented by data processing programs executed by a data processing equipment, such as a computer. Apparently, the data processing programs constitute the present invention. In addition, generally, the data processing programs stored in a storage medium are executed by directly reading the programs from the storage medium or by installing or copying the programs onto a storage device (e.g., a hard disk and/or a memory) of the data processing equipment. Therefore, such a storage medium also constitutes the present invention. The storage medium can be a record mode of any type, for example, a paper storage medium (e.g., a paper tape, etc.), a magnetic storage medium (e.g., a soft disk, a hard disk, a flash memory, etc.), an optical storage medium (e.g., a CD-ROM, etc.), a magneto-optical storage medium (e.g., an MO, etc.) or more.

Therefore, the present invention further discloses a storage medium with data processing programs stored therein, the data processing programs being used for executing any one embodiment of the method provided by the present invention.

In addition, in addition to the data processing programs, the steps of the method provided by the present invention can also be implemented by hardware. For example, the steps can be implemented by a logic gate, a switch, an Application-Specific Integrated Circuit (ASIC), a programmable logic controller, an embedded microcontroller or more. Thus, such hardware for implementing the method provided by the present invention also constitutes the present invention.

The forgoing description merely shows preferred embodiments of the present invention and is not intended to limit the present invention. Any modification, equivalent replacement or improvement made within the spirit and principle of the present invention shall fall into the protection scope of the present invention.

The invention claimed is:

1. A method for transmitting a synchronization signal and a physical sidelink broadcast channel (PSBCH) in a vehicle to vehicle/pedestrian/infrastructure/network (V2X) communication service, the method comprising:
   determining, by a V2X user equipment (VUE), a value of $N_{ID}^{SL}$ according to its reference synchronization source, wherein the $N_{ID}^{SL}$ is a sidelink synchronization source identifier (ID);
   determining, by the VUE, a sidelink synchronization signal (SLSS) and a demodulation reference signal (DMRS) of the PSBCH according to the value of $N_{ID}^{SL}$; and
   transmitting, by the VUE, the SLSS and the PSBCH, wherein, at least one of the SLSS and the DMRS included in the PSBCH transmitted by the VUE is different from at least one of an SLSS and a DMRS of a PSBCH used in a device to device (D2D) system,
   wherein the SLSS included in the PSBCH transmitted by the VUE includes a primary sidelink synchronization signal (PSSS) and a secondary sidelink synchronization signal (SSSS), one of the PSSS and the SSSS being different from one of a PSSS and a SSSS used in the D2D system,
   wherein the DMRS of the PSBCH is determined by a DMRS sequence of the PSBCH and an orthogonal mask of the DMRS of the PSBCH,
   wherein the reference synchronization source of the VUE, the VUE is classified into the following four types:
      type 1: the VUE is in coverage of a cell, and the VUE uses a base station as a reference synchronization source,
      type 2: the VUE is in coverage of a cell, and the VUE uses the GNSS as a reference synchronization source,
      type 3: the VUE is out coverage of a cell, and the VUE uses a GNSS as a reference synchronization source, and
      type 4: the VUE uses another VUE as a reference synchronization source, and
   wherein the determining, by a VUE, a value of $N_{ID}^{SL}$ according to its reference synchronization source comprises:
      if the VUE is of type 1, the VUE determines the value of $N_{ID}^{SL}$ receiving a base station signaling, and the value range of $N_{ID}^{SL}$ is [X1, 503] or [336, Y1], where both X1 and Y1 are set values,
      if the VUE is of type 2, the value range of $N_{ID}^{SL}$ of the VUE is [306,X1) or (Y1,503],
      if the VUE is of type 3, the value range of $N_{ID}^{SL}$ of the VUE is [306,X1) or (Y1,503], and the value of $N_{ID}^{SL}$ is the same as that of the VUE of type 2, or the value of $N_{ID}^{SL}$ is a value within the value range but different from that of the VUE of type 2, and
      if the VUE is of type 4, the value of $N_{ID}^{SL}$ of this VUE is the same as the value of $N_{ID}^{SL}$ of a reference synchronization source VUE.

2. The method according to claim 1, characterized in that: the VUE determines a PSSS root sequence index in the following ways:
   if the VUE is of type 1 or the value range of $N_{ID}^{SL}$ of the VUE is [X1,503] or [336,Y1], the PSSS root sequence index of the VUE is 26 or 37,
   if the VUE is of type 2 or if the value range of $N_{ID}^{SL}$ of the VUE is [306,X1) or (Y1,503], the PSSS root sequence index of the VUE is the same as that of the VUE of type 1, or the PSSS root sequence index of the VUE is 26 or 37 and is different from that of the VUE of type 1,
   if the VUE is of type 3, the PSSS root sequence index of the VUE is the same as that of the VUE of type 1, or the PSSS root sequence index of the VUE is 26 or 37 and is different from those of both the VUE of type 1 and the VUE of type 2, and the PSSS root sequence index of the VUE of type 1 is the same as that of the VUE of type 2,
   if the VUE is of type 4, the PSSS root sequence index of the VUE is the same as that of a reference synchronization source VUE,
   an SSSS sequence transmitted by the VUE corresponds to $N_{ID}^{(1)}=N_{ID}^{SL} \bmod 168$ and $N_{ID}^{(2)}=\lfloor N_{ID}^{SL}/168 \rfloor$, and a currently assumed subframe number is 0 or 5, and the DMRS sequence of the PSBCH and the orthogonal mask of the DMRS of the PSBCH transmitted by the VUE are determined according to the following table:

| Sequence index | $\lfloor N_{ID}^{SL}/16 \rfloor \bmod 30$ |
|---|---|
| Sequence cyclic shift | $\lfloor N_{ID}^{SL}/2 \rfloor \bmod 8$ |
| Orthogonal mask | [+1 +1], if $N_{ID}^{SL} \bmod 2 = 0$ |
|  | [+1 −1], if $N_{ID}^{SL} \bmod 2 = 1$. |

3. The method of claim 1, characterized in that:
if $N_{ID}^{SL}$ of the VUE of type 2 is the same as that of the VUE of type 3, the VUE of type 2 and the VUE of type 3 are distinguished by different values of a particular bit in a PSBCH reserved bit field.

4. A method for transmitting a synchronization signal and a physical sidelink broadcast channel (PSBCH) in a vehicle to vehicle/pedestrian/infrastructure/network (V2X) communication service, the method comprising:
  determining, by a V2X user equipment (VUE), a value of $N_{ID}^{SL}$ according to its reference synchronization source, wherein the $N_{ID}^{SL}$ is a sidelink synchronization source ID;
  determining, by the VUE, a sidelink synchronization signal (SLSS) and a demodulation reference signal (DMRS) of the PSBCH according to the value of $N_{ID}^{SL}$; and
  transmitting, by the VUE, the SLSS and the PSBCH,
  wherein, at least one of the SLSS and the DMRS included in the PSBCH transmitted by the VUE is different from at least one of an SLSS and a DMRS of a PSBCH used in a device to device (D2D) system,
  wherein the SLSS included in the PSBCH transmitted by the VUE includes a Primary Sidelink Synchronization Signal (PSSS) and a Secondary Sidelink Synchronization Signal (SSSS), one of the PSSS and the SSSS being different from one of a PSSS and a SSSS used in the D2D system,
  wherein the DMRS of the PSBCH is determined by a DMRS sequence of the PSBCH and an orthogonal mask of the DMRS of the PSBCH,
  wherein the reference synchronization source of the VUE, the VUE is classified into the following four types:
    type 1: the VUE is in coverage of a cell, and the VUE uses a base station as a reference synchronization source,
    type 2: the VUE is in coverage of a cell, and the VUE uses the GNSS as a reference synchronization source,
    type 3: the VUE is out coverage of a cell, and the VUE uses a GNSS as a reference synchronization source, and
    type 4: the VUE uses another VUE as a reference synchronization source, and wherein the determining, by a VUE, a value of $N_{ID}^{SL}$ according to its reference synchronization source comprises:
    if the VUE is of type 1, the VUE determines the value of $N_{ID}^{SL}$ receiving a base station signaling, and the value range of $N_{ID}^{SL}$ is [X2, 167] or [0, Y2], where both X2 and Y2 are set values,
    if the VUE is of type 2, the value range of $N_{ID}^{SL}$ of the VUE is [0,X2) or (Y2,167],
    if the VUE is of type 3, the value range of $N_{ID}^{SL}$ of the VUE is [0,X2) or (Y2,167], and the value of $N_{ID}^{SL}$ is the same as that of the VUE of type 2, or the value of $N_{ID}^{SL}$ is a value within the value range but different from that of the VUE of type 2, and
    if the VUE is of type 4, the value of $N_{ID}^{SL}$ of this VUE is the same as the value of $N_{ID}^{SL}$ of a reference synchronization source VUE.

5. The method according to claim 4, characterized in that:
the VUE determines a PSSS root sequence index in the following ways:
  if $N_{ID}^{SL} \leq 167$, the root sequence index is 26, or otherwise, the root sequence index is 37,
  an SSSS sequence transmitted by the VUE corresponds to $N_{ID}^{(1)}=N_{ID}^{SL} \bmod 168$ and $$N_{ID}^{(2)} = \begin{cases} 1, \text{ if } \lfloor N_{ID}^{SL}/168 \rfloor = 0 \\ 0, \text{ if } \lfloor N_{ID}^{SL}/168 \rfloor = 1 \end{cases},$$

and a currently assumed subframe number is 0, or
an SSSS sequence transmitted by the VUE corresponds to $N_{ID}^{(1)}=\bmod 168$ and $N_{ID}^{(2)}=\lfloor N_{ID}^{SL}/168 \rfloor$, and the currently assumed subframe number is 5, and
the DMRS sequence of the PSBCH and the orthogonal mask of the DMRS of the PSBCH transmitted by the VUE are determined according to the following table:

| Sequence index | $\lfloor N_{ID}^{SL}/16 \rfloor \bmod 30$ |
|---|---|
| Sequence cyclic shift | $\lfloor N_{ID}^{SL}/2 \rfloor \bmod 8$ |
| Orthogonal mask | [+1 +1], if $N_{ID}^{SL} \bmod 2 = 0$ |
|  | [+1 −1], if $N_{ID}^{SL} \bmod 2 = 1$. |

6. The method according to claim 4, characterized in that:
the VUE determines a PSSS root sequence index in the following ways:
  if $N_{ID}^{SL} \leq 167$, the root sequence index is 37, or otherwise, the root sequence index is 26,
  an SSSS sequence transmitted by the VUE corresponds to $N_{ID}^{(1)}=N_{ID}^{SL} \bmod 168$ and $N_{ID}^{(2)}=\lfloor N_{ID}^{SL}/168 \rfloor$, and a currently assumed subframe number is 0, and
  the DMRS sequence of the PSBCH and the orthogonal mask of the DMRS of the PSBCH transmitted by the VUE are determined according to the following table:

| Sequence index | $\lfloor N_{ID}^{SL}/16 \rfloor \bmod 30$ |
|---|---|
| Sequence cyclic shift | $\lfloor N_{ID}^{SL}/2 \rfloor \bmod 8$ |
| Orthogonal mask | [+1 +1], if $N_{ID}^{SL} \bmod 2 = 0$ |
|  | [+1 −1], if $N_{ID}^{SL} \bmod 2 = 1$. |

7. A method for transmitting a synchronization signal and a physical sidelink broadcast channel (PSBCH) in a vehicle to vehicle/pedestrian/infrastructure/network (V2X) communication service, the method comprising:
  determining, by a V2X user equipment (VUE), a value of $N_{ID}^{SL}$ according to its reference synchronization source, wherein the $N_{ID}^{SL}$ is a sidelink synchronization source ID;
  determining, by the VUE, a sidelink synchronization signal (SLSS) and a demodulation reference signal (DMRS) of the PSBCH according to the value of $N_{ID}^{SL}$; and
  transmitting, by the VUE, the SLSS and the PSBCH,
  wherein, at least one of the SLSS and the DMRS included in the PSBCH transmitted by the VUE is different from at least one of an SLSS and a DMRS of a PSBCH used in a device to device (D2D) system, wherein the SLSS included in the PSBCH transmitted by the VUE includes a primary sidelink synchronization signal (PSSS) and a secondary sidelink synchronization signal (SSSS), one of the PSSS and the SSSS being different from one of a PSSS and a SSSS used in the D2D system, wherein the DMRS of the PSBCH is determined by a DMRS sequence of the PSBCH and an orthogonal mask of the DMRS of the PSBCH, wherein the reference synchronization source of the VUE, the VUE is classified into the following four types:
  type 1: the VUE is in coverage of a cell, and the VUE uses a base station as a reference synchronization source,
  type 2: the VUE is in coverage of a cell, and the VUE uses the GNSS as a reference synchronization source,
  type 3: the VUE is out coverage of a cell, and the VUE uses a GNSS as a reference synchronization source, and
  type 4: the VUE uses another VUE as a reference synchronization source, and wherein the determining, by a VUE, a value of $N_{ID}^{SL}$ according to its reference synchronization source comprises:
    if the VUE is of type 1, the VUE determines the value of $N_{ID}^{SL}$ receiving a base station signaling, and the value range of $N_{ID}^{SL}$ is [X3,335] or [168,Y3], where both X3 and Y3 are set values,
    if the VUE is of type 2, the value range of $N_{ID}^{SL}$ of the VUE is [168,X3] or (Y3,335],
    if the VUE is of type 3, the value range of $N_{ID}^{SL}$ of the VUE is [168,X3] or (Y3,335], and the value of Na is the same as that of the VUE of type 2, or the value of $N_{ID}^{SL}$ is a value within the value range but different from that of the VUE of type 2, and
    if the VUE is of type 4, the value of $N_{ID}^{SL}$ of this VUE is the same as the value of $N_{ID}^{SL}$ of a reference synchronization source VUE.

8. The method according to claim 7, characterized in that:
the VUE determines a PSSS root sequence index in the following ways:
  if the VUE is of type 1 or the value range of $N_{ID}^{SL}$ of the VUE is [X3,335] or [168,Y3], the PSSS root sequence index of the VUE is 26 or 37,
  if the VUE is of type 2 or if the value range of $N_{ID}^{SL}$ of the VUE is [168,X3] or (Y3,335], the PSSS root sequence index of the VUE is the same as that of the VUE of type 1; or the PSSS root sequence index of the VUE is 26 or 37 and is different from that of the VUE of type 1,
  if the VUE is of type 3, the PSSS root sequence index of the VUE is the same as that of the VUE of type or the PSSS root sequence index of the VUE is 26 or 37 and is different from those of both the VUE of type 1 and the VUE of type 2, and the PSSS root sequence index of the VUE of type 1 is the same as that of the VUE of type 2,
  if the VUE is of type 4, the PSSS root sequence index of the VUE is the same as that of a reference synchronization source VUE,
  an SSSS sequence transmitted by the VUE corresponds to $N_{ID}^{(1)}=N_{ID}^{SL}$ mod 168 and $N_{ID}^{(2)}=\lfloor N_{ID}^{SL}/168 \rfloor$, and a currently assumed subframe number is 0 or 5, and the DMRS sequence of the PSBCH and the orthogonal mask of the DMRS of the PSBCH transmitted by the VUE are determined according to the following table:

| Sequence index | $\lfloor N_{ID}^{SL}/16 \rfloor \bmod 30$ |
| Sequence cyclic shift | $\lfloor N_{ID}^{SL}/2 \rfloor \bmod 8$ |
| Orthogonal mask | [+1 +1], if $N_{ID}^{SL}$ mod2 = 0 |
| | [+1 −1], if $N_{ID}^{SL}$ mod2 = 1. |

9. A method for transmitting a synchronization signal and a physical sidelink broadcast channel (PSBCH) in a vehicle to vehicle/pedestrian/infrastructure/network (V2X) communication service, the method comprising:
  determining, by a V2X user equipment (VUE), a value of $N_{ID}^{SL}$ according to its reference synchronization source, wherein the $N_{ID}^{SL}$ is a sidelink synchronization source ID;
  determining, by the VUE, a sidelink synchronization signal (SLSS) and a demodulation reference signal (DMRS) of the PSBCH according to the value of $N_{ID}^{SL}$; and
  transmitting, by the VUE, the SLSS and the PSBCH,
  wherein, at least one of the SLSS and the DMRS included in the PSBCH transmitted by the VUE is different from at least one of an SLSS and a DMRS of a PSBCH used in a device to device (D2D) system,
  wherein the SLSS included in the PSBCH transmitted by the VUE includes a primary sidelink synchronization signal (PSSS) and a secondary sidelink synchronization signal (SSSS), one of the PSSS and the SSSS being different from one of a PSSS and a SSSS used in the D2D system,
  wherein the DMRS of the PSBCH is determined by a DMRS sequence of the PSBCH and an orthogonal mask of the DMRS of the PSBCH,
  wherein the reference synchronization source of the VUE, the VUE is classified into the following four types:
    type 1: the VUE is in coverage of a cell, and the VUE uses a base station as a reference synchronization source,
    type 2: the VUE is in coverage of a cell, and the VUE uses the GNSS as a reference synchronization source,
    type 3: the VUE is out coverage of a cell, and the VUE uses a GNSS as a reference synchronization source, and
    type 4: the VUE uses another VUE as a reference synchronization source, and
  wherein the determining, by a VUE, a value of $N_{ID}^{SL}$ according to its reference synchronization source comprises:
    if the VUE is of type 1, the VUE determines the value of $N_{ID}^{SL}$ receiving a base station signaling, and the value range of $N_{ID}^{SL}$ is [X3,335] or [168,Y3], where both X3 and Y3 are set values,
    if the VUE is of type 2, the value range of Na of the VUE is [168,X3] or (Y3,335],
    if the VUE is of type 3, the value range of Na of the VUE is [168, X3) or (Y3,335], and the value of $N_{ID}^{SL}$ is the same as that of the VUE of type 2, or the value of $N_{ID}^{SL}$ is a value within the value range but different from that of the VUE of type 2, and
    if the VUE is of type 4, the value of $N_{ID}^{SL}$ of this VUE is the same as the value of $N_{ID}^{SL}$ of a reference synchronization source VUE.

10. The method according to claim 9, characterized in that:

the VUE determines a PSSS root sequence index in the following ways:
if $N_{ID}^{SL} \leq 167$, the root sequence index is 26, or otherwise, the root sequence index is 37, an SSSS sequence transmitted by the VUE corresponds to $N_{ID}^{(1)} = N_{ID}^{SL} \bmod 168$ and $N_{ID}^{(2)} = \lfloor N_{ID}^{SL}/168 \rfloor$, and a currently assumed subframe number is 0, and the DMRS sequence of the PSBCH and the orthogonal mask of the DMRS of the PSBCH transmitted by the VUE are determined according to one of the following tables:

| | |
|---|---|
| Sequence index | $\lfloor N_{ID}^{SL}/16 \rfloor \bmod 30 + \Delta_1$ |
| Sequence cyclic shift | $\lfloor N_{ID}^{SL}/2 \rfloor \bmod 8 + \Delta_2$ |
| Orthogonal mask | [+1 +1], if $N_{ID}^{SL} \bmod 2 = 0$ |
| | [+1 −1], if $N_{ID}^{SL} \bmod 2 = 1$, | or:

| | |
|---|---|
| Sequence index | $\lfloor N_{ID}^{SL}/16 \rfloor \bmod 30$ |
| Sequence cyclic shift | $\lfloor N_{ID}^{SL}/2 \rfloor \bmod 8$ |
| Orthogonal mask | [+1 +1], if $N_{ID}^{SL} \bmod 2 = 1$ |
| | [+1 −1], if $N_{ID}^{SL} \bmod 2 = 0$, | or:

| | |
|---|---|
| Sequence index | $\lfloor N_{ID}^{SL}/16 \rfloor \bmod 30 + \Delta_1$ |
| Sequence cyclic shift | $\lfloor N_{ID}^{SL}/2 \rfloor \bmod 8 + \Delta_2$ |
| Orthogonal mask | [+1 +1], if $N_{ID}^{SL} \bmod 2 = 1$ |
| | [+1 −1], if $N_{ID}^{SL} \bmod 2 = 0$. |

* * * * *